United States Patent
Lindqvist et al.

(10) Patent No.: US 11,190,268 B2
(45) Date of Patent: Nov. 30, 2021

(54) HYBRID SATELLITE TERRESTRIAL BROADBAND NETWORK

(71) Applicant: Forsway Scandinavia AB, Skövde (SE)

(72) Inventors: Edvin Lindqvist, Kista (SE); Mats Andersson, Kista (SE)

(73) Assignee: Forsway Scandinavia AB

( * ) Notice: Subject to any disclaimer, the term of this patent is extended or adjusted under 35 U.S.C. 154(b) by 0 days.

(21) Appl. No.: 16/066,657

(22) PCT Filed: Dec. 29, 2016

(86) PCT No.: PCT/EP2016/082879
§ 371 (c)(1),
(2) Date: Jun. 27, 2018

(87) PCT Pub. No.: WO2017/114924
PCT Pub. Date: Jul. 6, 2017

(65) Prior Publication Data
US 2019/0020406 A1    Jan. 17, 2019

(30) Foreign Application Priority Data

Dec. 29, 2015   (EP) .................................... 15202990

(51) Int. Cl.
*H04B 7/185* (2006.01)
*H01Q 1/12* (2006.01)

(52) U.S. Cl.
CPC ....... *H04B 7/18589* (2013.01); *H01Q 1/1257* (2013.01); *H04B 7/1858* (2013.01); *H04B 7/18517* (2013.01); *H04B 7/18578* (2013.01); *H04B 7/18513* (2013.01); *H04B 7/18582* (2013.01)

(58) Field of Classification Search
CPC .. H01Q 1/157; H01Q 1/1257; H04B 7/18589; H04B 7/18513; H04B 7/18517; H04B 7/18578; H04B 7/1858; H04B 7/18582
See application file for complete search history.

(56) References Cited

U.S. PATENT DOCUMENTS

| | | | |
|---|---|---|---|
| 5,920,804 A * | 7/1999 | Armbruster | H04B 7/18584 455/13.2 |
| 8,843,059 B2 | 9/2014 | Roos et al. | |
| 9,026,042 B1 | 5/2015 | Nemeth et al. | |
| 2002/0090942 A1* | 7/2002 | Karabinis | H04B 7/18563 455/427 |

(Continued)

FOREIGN PATENT DOCUMENTS

| | | | |
|---|---|---|---|
| EP | 1 052 812 A2 | 11/2000 | |
| EP | 1049269 A2 * | 11/2000 | H04B 7/18513 |

(Continued)

*Primary Examiner* — Zhensheng Zhang
(74) *Attorney, Agent, or Firm* — Condo Roccia Koptiw LLP

(57) ABSTRACT

The present specification generally relates to the field of satellite communication and particularly discloses a method and arrangement for providing broadband from a hybrid satellite-terrestrial solution. The system is adapted to have a improved latency in a less complex construction that provides overall cost benefits and comprises a user terminal, a satellite and a satellite gateway.

18 Claims, 2 Drawing Sheets

(56) References Cited

U.S. PATENT DOCUMENTS

| | | |
|---|---|---|
| 2003/0058810 A1 | 3/2003 | Petronic |
| 2003/0203733 A1 | 10/2003 | Sharon |
| 2004/0027308 A1* | 2/2004 | Lynch ..................... H01Q 9/27 343/895 |
| 2007/0129019 A1 | 6/2007 | Otten et al. |
| 2017/0118064 A1* | 4/2017 | Medina ............... H04L 41/0654 |
| 2018/0227043 A1* | 8/2018 | Dankberg .......... H04B 7/18515 |

FOREIGN PATENT DOCUMENTS

| | | |
|---|---|---|
| EP | 1 091 505 A2 | 4/2001 |
| EP | 1 152 552 A2 | 11/2001 |

* cited by examiner

HYBRID SATELLITE TERRESTRIAL BROADBAND NETWORK

CROSS REFERENCE TO RELATED APPLICATIONS

This application is the National Stage Entry under 35 U.S.C. § 371 of Patent Cooperation Treaty Application No. PCT/EP2016/082879, filed Dec. 29, 2016, which claims priority from European Application No. 15202990.6, filed Dec. 29, 2015, the contents of which are hereby incorporated by reference herein.

TECHNICAL FIELD

The present invention generally relates to the field of satellite communication and more particularly to a hybrid satellite-terrestrial broadband method and system.

TECHNICAL BACKGROUND

Generally, communication can be provided in a numerous of different way, each of them associated with their specific requirements and potential problems. For example, communication can be performed by means of a terrestrial system or by means of a satellite system.

Terrestrial communications requires the existence of suitable infrastructure. In lack of such a terrestrial infrastructure there are several satellite communication methods which can be used.

In order to have a predictable behavior of a satellite, it may be positioned in a geostationary orbit, that way its position relative the earth surface will be constant. A satellite in a geostationary orbit is positioned at close to 35786 km. To keep a satellite at an even orbit, a traveling speed is needed, this speed vary with the altitude of the satellite. At the geostationary orbit, that traveling speed is equal to the movement due to the rotation of the earth. Hence an object in an even orbit at 35786 km will be viewed as having a constant position by a terrestrially located observer. Should a satellite be located in another orbital, it will have to move at a speed in relation to the earth surface and will be viewed as moving by a terrestrially located observer. Due to the distance a signal has to travel from and to a satellite, such communication has an inherent delay. This delay can be reduced by positioning the satellite in an orbital closer to the earth.

However, utilizing a satellite having a trajectory closer to the earth is also associated with specific requirements and potential problems. For example, by positioning a satellite closer to the earth, the position of the satellite will be viewed as moving by a terrestrially located observer. In order to have a continuous connection with such an orbiting satellite, the terrestrially located antenna in communication with the satellite needs to be a directable antenna. In other cases, the transmission would be hard both to receive and transmit. There would also be a risk that an undirected or incorrectly directed communication could disturb other satellite communication links. Even more, such an antenna complicates the transmitting part of the terrestrially located equipment and increases the overall cost.

Thus, the inventor of the present invention have identified a need for improvements in providing satellite communication that is designed to overcome or at least mitigate the problems stated above, and which provides a satellite communication method with an improved latency in a less complex construction that provides cost benefits.

SUMMARY OF THE INVENTION

An object of the present invention is to provide a system for providing communication at least partly using a satellite link which overcomes the problems stated above.

A further object of the present invention is to provide a system with advantages relating to cost, time for employment, flexibility and/or scalability.

The present invention is defined according to the independent claims. Preferred embodiments are set forth in the dependent claims.

The invention is based on an insight that while a satellite provides the bandwidth needed and a satellite with a lower orbit may be used to provide a low latency for the communication a more efficient communication method is allowed by utilizing a terrestrial link for the return link. By using a terrestrial link for uplink communication a signal only needs to travel via a satellite link on the downlink and by this the overall latency is decreased in relation to utilizing a high altitude satellite for uplink and downlink communications. Further, since the downlink communication is still performed from a satellite and the uplink typically requires a lower bandwidth, the bandwidth requirements on the terrestrial link can be kept low.

Furthermore, by utilizing a terrestrial link for the return link, there is no need for a transmitting means that is capable to transmit uplink communication to a satellite. Such a transmitting means needs to be directional and accurate in order to not interfere with other communications via other satellites. However, by the present invention, there is no longer a need for such transmitting means. Since a user terminal according to the present invention does not need a directional and accurate antenna for the uplink, cost savings may be achieved in relation to other satellite communication systems. Further cost benefits are achieved by utilizing satellites in a lower orbit, mainly due to a decreased cost of deployment, but also in less expensive communication means arranged on the satellite.

The term "latency" in this context means a time delay in the communication system. In the present context it is typically a result from the time a signal needs in order to travel a distance, such as when being relayed through a satellite link.

The term "downlink" or "forward link" in this context means a link that connects from a serving device to a receiving device. The link may be an actual physical link or it may be a logical link that uses at least one actual physical links. In the present context it is typically a link that serves a user terminal with communication data.

The term "uplink" or "return link" in this context means a link that connects from a receiving device to a serving device. The link may be an actual physical link or it may be a logical link that uses at least one actual physical links. In the present context it is typically a link from a user terminal that requests communication data.

The term "lower orbit" in this context means an orbit below the orbit of a geo stationary orbit.

The term "satellite link" in this context means a communication subsystem that involves a satellite between a transmitting part and a receiving part. In this case it is typically communication data from the Internet that is sent to a user terminal via a satellite gateway and a satellite.

The term "terrestrial link" in this context means a communication subsystem that does not involve a satellite between a transmitting part and a receiving part, i.e. a transmitted signal travels on, near or below ground. As a non-limiting example, a terrestrial link may be over a cellular and/or a xDSL network.

According to one aspect of the invention, a method for communicating data in a hybrid satellite-terrestrial system is provided. The method comprises receiving and transmitting communication data to and from a user terminal. The user terminal receives downlink communication data from the Internet from a satellite gateway via a satellite link from one of a low earth orbit (LEO) satellite and a medium earth orbit (MEO) satellite. The user terminal transmits uplink communication data to the Internet via one or at least one terrestrial link from the user terminal. Further, the receiving to the user terminal and transmitting from the user terminal are concurrent. One example is when the user terminal, via the terrestrial link, provides communication data and requests communication data to be delivered via the satellite link. Another example is when the user terminal, while receiving communication data via the satellite link, requests more communication data over the terrestrial link. Since several communication paths may be maintained in parallel, there is no need to wait for a finished delivery until requesting more communication data. However, different situations may need alternate solutions, serial communication management or a combination between serial and parallel communication management may be needed. The communication and the data transmitted and received may relate to e-mail, skype, web browsing, streaming etc.

A method according to the present invention overcomes the problems stated previously. Suitable applications for a method according to the present invention may be a situation where a terrestrial connection is available, but may not have sufficient capacity to provide required downlink bandwidth. Communication data to the user terminal, originating from the Internet, may for an example be transferred to a satellite gateway where it may be directed to a satellite for retransmission to the user equipment. By this, a broadband connection may be established.

The term "communication data" in this context means the communication or transfer of data or information according to an OSI model such as TCP/IP.

The term "low earth orbit" in this context means an orbit around earth with an altitude between 160 km and 2000 km.

The term "medium earth orbit", or "intermediate circular orbit", in this case means an orbit around earth with an altitude between low earth orbit and geo stationary orbit.

In one embodiment, the terrestrial link used to transmit uplink communication from the user terminal may go via the satellite gateway. The terrestrial link may transmit over the internet.

In one embodiment, the satellite link may utilize more than one satellite in transmitting downlink communication data to the user terminal. For an example a first satellite may receive a signal from a satellite gateway, then relay the signal to a second satellite which in turn sends the signal to the user terminal. More than two satellites may be involved in relaying a signal. As another example multiple satellites may be used to establish several communication links to the user terminal. A combination may also be utilized, such as using multiple satellites for relaying each out of a plurality of communications links. The more than one satellite utilized may be LEO satellites, MEO satellites or a combination thereof.

In one embodiment, the satellite link may utilize more than one satellite gateway in transmitting downlink communication data to the user terminal. The more than one gateway may utilize one or more satellites for establish a satellite link with the user terminal.

In one embodiment, the user terminal receives downlink communication data from the Internet through at least one terrestrial link from the satellite gateway. This embodiment allows for a more flexible connection where connections may exist for downlink data over both a satellite connection and a terrestrial connection. Furthermore, the terrestrial downlink connection may be in parallel to the satellite downlink connection, but may also be before or after. One non-limiting example is where data is concurrently received from a satellite connection and transmitted on a terrestrial connection, then followed by that data is received from a terrestrial connection or concurrently received from a terrestrial connection and transmitted on a terrestrial connection. Further examples with serial and/or parallel communication also exist.

In one embodiment, the user terminal receives downlink communication data over a data rate threshold from the Internet from the satellite gateway via the satellite link from one of a LEO satellite and a MEO satellite and that the user terminal may receive downlink communication data up to a data rate threshold from the Internet from the Internet through the terrestrial link from the satellite gateway. This embodiment allows for a degree of control while having a flexible connection. It is understood that the threshold may in alternative also be applied on the terrestrial communication in such way that communication is performed over a satellite connection up to a threshold, then over a terrestrial connection over a threshold. Furthermore, the threshold can for an example be on total amount of data, data rate, total amount of data per timeframe, or any combination thereof.

In one embodiment, the user terminal receives downlink communication data from the Internet through a terrestrial link from the satellite gateway in response to a temporary loss of communication through the satellite link. By utilizing a redundant link such as a terrestrial link from the satellite gateway to the user terminal, this embodiment can be made more reliable and decrease any delays associated with for an example a temporary loss of satellite link.

In one embodiment, the user terminal receives downlink communication data from the Internet through a terrestrial link from the satellite gateway in response to a temporary loss of communication through the satellite link due to a change of satellite. A situation where a change of satellite is necessary may for an example occur if the active satellite moves out of range, are lacking in bandwidth or any other deficiency in the active satellite link. The change of satellite may also be a planned redirection, such as changing from one satellite to a second one. By utilizing satellites that move relative to the earth surface, if a satellite moves out of range during a communication session, there may be a need to change the satellite from which the user terminal receives communication data. By utilizing a terrestrial network for communication during change of satellite this embodiment allows for a decreased degree of interruptions that could otherwise occur during change of satellite.

In one embodiment, information relating to a satellite orbit may be combined with information relating to a position of a user terminal to predict a temporary loss of communication through a satellite link. By knowing the position of the satellite and the position of the user terminal the relative direction can be calculated. Such calculation can be performed by the user terminal or at a centralized location. The relative direction may be combined with information relating to a line of sight, information relating to obstructions or similar in order to predict when a satellite moves out of range or similar. This embodiment allows for aligning a satellite receiving means towards a direction of a satellite before a temporary loss of communication may occur. The satellite may be a LEO satellite, a MEO satellite, a GEO satellite or a combination thereof. The direction of the one of a LEO satellite and a MEO satellite may be variable over time and depend on the selection of a specific satellite out of a plurality of possible satellites. The information relating to a position of a user terminal may come from a plurality of different sources, such as a positioning device at the terminal, a triangulation made by the terrestrial network, manual input or a combination thereof. For example, this embodiment may be used to predict when more resources may be used.

In one embodiment, information relating to a satellite orbit may be combined with information relating to a position of a user terminal to predict a temporary loss of communication through a satellite link. By knowing the position of the satellite and the position of the user terminal the relative direction can be calculated. Such calculation can be performed by the user terminal or at a centralized location. The relative direction may be combined with information relating to a line of sight, information relating to obstructions or similar in order to predict when a satellite moves out of range or similar. The prediction may redirect downlink communication data from the Internet to the user terminal through a terrestrial link from the satellite gateway to avoid temporary loss of communication.

In one embodiment, information relating to a weather situation may be combined with information relating to a position of a user terminal to predict a temporary loss of communication through a satellite link. By knowing the predicted or present weather situation and the position of the user terminal the predicted or present weather situation at the position of the user terminal can be calculated. Such calculation can be performed by the user terminal or at a centralized location. The information relating to a position of a user terminal may come from a plurality of different sources, such as a positioning device at the terminal, a triangulation made by the terrestrial network, manual input or a combination thereof. A predicted weather situation may be used to predict a temporary loss of communication through a satellite link. For example rain may result in a dampened communication signal due to rain fade.

In one embodiment, information relating to a weather situation may be combined with information relating to a position of a user terminal to predict a temporary loss of communication through a satellite link. By knowing the predicted weather situation and the position of the user terminal the predicted weather situation at the position of the user terminal can be calculated. Such calculation can be performed by the user terminal or at a centralized location. The information relating to a position of a user terminal may come from a plurality of different sources, such as a positioning device at the terminal, a triangulation made by the terrestrial network, manual input or a combination thereof. A predicted weather situation may be used to predict a temporary loss of communication through a satellite link. For example rain may result in a dampened communication signal due to rain fade. This embodiment allows for aligning a satellite receiving means towards a direction of a satellite before a temporary loss of communication may occur. The satellite may be a LEO satellite, a MEO satellite, a GEO satellite or a combination thereof. The direction of the one of a LEO satellite and a MEO satellite may be variable over time and depend on the selection of a specific satellite out of a plurality of possible satellites.

In one embodiment, information relating to a weather situation may be combined with information relating to a position of a user terminal to predict a temporary loss of communication through a satellite link. By knowing the predicted weather situation and the position of the user terminal the predicted weather situation at the position of the user terminal can be calculated. Such calculation can be performed by the user terminal or at a centralized location. The information relating to a position of a user terminal may come from a plurality of different sources, such as a positioning device at the terminal, a triangulation made by the terrestrial network, manual input or a combination thereof. A predicted weather situation may be used to redirect downlink communication data from the Internet to the user terminal through a terrestrial link from the satellite gateway to avoid temporary loss of communication.

In one embodiment, information relating to a weather situation may be combined with information relating to a position of a user terminal to predict a temporary loss of communication through a satellite link. By knowing the predicted weather situation and the position of the user terminal the predicted weather situation at the position of the user terminal can be calculated. Such calculation can be performed by the user terminal or at a centralized location. The information relating to a position of a user terminal may come from a plurality of different sources, such as a positioning device at the terminal, a triangulation made by the terrestrial network, manual input or a combination thereof. A predicted weather situation may be used to redirect uplink data from the satellite gateway and/or downlink communication data from the Internet to the user terminal through a terrestrial link from the satellite gateway to avoid temporary loss of communication. For example rain may result in a dampened communication signal due to rain fade. This embodiment allows for aligning a satellite receiving means towards a direction of a satellite before a temporary loss of communication may occur. The satellite may be a LEO satellite, a MEO satellite, a GEO satellite or a combination thereof. The direction of the one of a LEO satellite and a MEO satellite may be variable over time and depend on the selection of a specific satellite out of a plurality of possible satellites.

In one embodiment, the user terminal receives satellite configuration information through a terrestrial link from the satellite gateway in response to a loss of communication through the satellite link due to a malfunction of a satellite. A situation where a change of satellite is necessary may for an example occur if the active satellite moves out of range, are lacking in bandwidth, is re-routed, breaks, malfunctions, a weather situation or any other deficiency in the satellite link. The change of satellite may also be a planned redirection, such as changing from one satellite to a second one. By utilizing satellites that move relative to the earth surface, if a satellite moves out of range during a communication session, there may be a need to change the satellite from which the user terminal receives communication data. By utilizing a terrestrial network for communicating satellite configuration information this embodiment allows for a decreased degree of downtime that could otherwise occur from a malfunctioning or similar satellite.

In one embodiment, the user terminal receives satellite configuration information and that the user terminal is configured according to the received satellite configuration information. The configuration information may be in plain text or encrypted, decryption may for an example utilize a password, a piece of hardware as a key, location based encryption or a combination thereof. The configuration of the user terminal may be automatic or rely on confirmation by a user, the configuration may also be delayed until the occurrence of an event, such as a reboot or a set time. The configuration information may be transmitted through a single or multiple channels and/rely on one or more different means, for an example a part of the configuration information may be sent via one or multiple terrestrial connections, a part via a satellite connection and a part managed at the user terminal. The configuration may also be transmitted in full over one of the available communication channels. This embodiment allows a user terminal to receive a preset configuration that ensures a stable connection. Further, it is possible to broadcast changes to a plurality of user terminals in this way.

In one embodiment, the user terminal receives satellite configuration information for a plurality of satellites. The user terminal may comprise a plurality of receiving means and configure the plurality of receiving means according to the received configuration information. By this the user equipment may be arranged to receive downlink communication data from a plurality of different satellites. This embodiment allows an increased bandwidth for receiving the downlink communication data by utilizing capacity from several satellites.

In one embodiment, the user terminal receives satellite configuration information via a terrestrial link from the satellite gateway and that the user terminal may be configured according to the received satellite configuration information. As an example configuration information may be received over a terrestrial connection. Other possibilities include a local database, coupled to hardware such as a portable memory, manual input by a user or any combination thereof. This embodiment allows for change management and configuration without relying on the satellite that is to be used for communication of the parameters.

In one embodiment, the user terminal aligns a satellite receiving means towards a direction of the one of a LEO satellite and a MEO satellite. The alignment may be performed in an automated or manual manner. Should the alignment be performed manually there may be some guidance means to help a user.

In one embodiment, the user terminal receives satellite configuration information via a terrestrial link from the satellite gateway and that the user terminal may be configured according to the received satellite configuration information. As an example configuration information may be received over a terrestrial connection. Other possibilities include storage in a local database, coupled to hardware such as a portable memory or any combination thereof. This embodiment allows for change management and configuration without relying on the satellite that is to be used for communication of the parameters.

Thus allowing a more stable communication channel. For example, this may be utilized when a satellite is out of order, malfunctioning, re-routed or similar.

In one embodiment, the satellite configuration information may comprise information relating to a satellite orbit. The information relating to a satellite orbit may be combined with information relating to a position of a user terminal. By knowing the position of the satellite and the position of the user terminal the relative direction can be calculated. Such calculation can be performed by the user terminal or at a centralized location. This embodiment allows for aligning a satellite receiving means towards a direction of the one of a LEO satellite and a MEO satellite. The direction of the one of a LEO satellite and a MEO satellite may be variable over time and depend on the selection of a specific satellite out of a plurality of possible satellites. The information relating to a position of a user terminal may come from a plurality of different sources, such as a positioning device at the terminal, a triangulation made by the terrestrial network, manual input or a combination thereof.

In one embodiment, the user terminal receives satellite configuration information through a terrestrial link from the satellite gateway in response to a loss of communication through the satellite link due to a malfunction of a satellite. A situation where a change of satellite is necessary may for an example occur if the active satellite moves out of range, are lacking in bandwidth, is re-routed, breaks, malfunctions, a weather situation or any other deficiency in the satellite link. The change of satellite may also be a planned redirection, such as changing from one satellite to a second one. By utilizing satellites that move relative to the earth surface, if a satellite moves out of range during a communication session, there may be a need to change the satellite from which the user terminal receives communication data. By utilizing a terrestrial network for communicating satellite configuration information this embodiment allows for a decreased degree of downtime that could otherwise occur from a malfunctioning or similar satellite.

The term "satellite receiving means" in this context means any device with the capability to receive a transmission from a satellite.

The term "guidance means" in this context means any device or function that may be used to assist a user in aligning the receiving means. For an example it may be an indication of signal strength or such.

In one embodiment, the user terminal receives information related to the direction of the one of a LEO satellite and a MEO satellite via a terrestrial link and may align a satellite receiving means based on the received information related to the direction. The information related to the direction may be a direction in which the receiving means should be directed at, the information may also relate to the position of a satellite. By knowing the position of the satellite and the position of the user terminal the relative direction can be calculated. Such calculation can be performed by the user terminal or at a centralized location. Either way, the user terminal may communicate its location over any available communication means. Should the location of the user terminal not be available, there may be a way provided to manually or automatically insert such information, such as an interface to a GPS receiver, a terminal or a web interface. The information related to the direction may relate to the direction in which the satellite is positioned, the position of the satellite, the trajectory of the satellite, or any combination thereof. The information is not limited to specific instances, but may be a more or less complete database with information on one or more satellite together with information on which satellite to utilize or means to calculate which satellite to utilize. Further, the concept is not limited to receiving information related to the direction over a terrestrial link, the information may be received from a local database, from hardware such as a portable memory, input manually by a user or any combination thereof. The information may also be delivered by an already established satellite connection, in such cases a first satellite may inform a user equipment in which direction a second satellite is positioned, so that the system may perform a handover from the first satellite to the second satellite. It is possible to state conditions in which a handover should be performed, for an example a direction to align into upon a lost connection. Further, the direction may have information relating to a beam angle and from this calculate tolerances to which the alignment can take into account. This embodiment allows a user terminal to be automated to a degree, especially a setup of the receiving means.

According to a further aspect of the invention, a user terminal for communicating data in a hybrid satellite-terrestrial system is provided. The user terminal comprises a receiver means and a transmitter means. The receiver means is arranged to receive downlink communication data from the Internet from a satellite gateway via a satellite link from one of a LEO satellite and a MEO satellite to the user terminal. The transmitter means is arranged to transmit uplink communication data to the Internet via at least one terrestrial link from the user terminal. Further, the receiver means and the transmitter means are arranged to enable concurrent receiving and transmitting. The user terminal may be adapted to carry out any method described in disclosed embodiments.

In one embodiment, the receiver means is further arranged to receive downlink communication data from the Internet through at least one terrestrial link from the satellite gateway to the user terminal.

In one embodiment, the receiver means further comprises a steerable antenna. The steerable antenna may be at least one of a mechanically steerable antenna and a electronically steerable antenna.

In one embodiment, the receiver means further comprises a steerable phased array antenna. This embodiment allows an antenna that is steerable without additional moving parts, the phased array antenna may further be arranged to receive downlink communication data from a plurality of different satellites. By this the user terminal may utilise a single receiving means while still maintaining a high level of flexibility. By reducing the number of moving parts the robustness of the user terminal may be increased.

In one embodiment, the receiver means further comprises a steerable phased array antenna arranged for concurrent usage. This embodiment allows an antenna that is steerable without additional moving parts, the phased array antenna may further be arranged to receive concurrent downlink communication data from a plurality of different satellites. For example, downlink communication data may be received from one or a plurality of GEO satellites, one or a plurality of MEO satellites, one or a plurality of LEO satellites, or a combination thereof. By this the user terminal may utilise a single receiving means while still maintaining a high level of flexibility.

In one embodiment, the user terminal for communicating data in a hybrid satellite-terrestrial system may further comprise receiver means that is arranged to receive satellite configuration information and configurating means to configure the user terminal according to the received satellite configuration information.

In one embodiment, the steerable antenna is arranged for automatic alignment towards a direction of the one of a LEO satellite and a MEO satellite.

In one embodiment, the user terminal is arranged to receive information related to the direction of the one of a LEO satellite and a MEO satellite via a terrestrial link.

In one embodiment, the transmitter means is arranged to transmit uplink communication data to the Internet only via a terrestrial link from the user terminal to the satellite gateway.

In one embodiment, the user terminal is arranged not to transmit uplink communication data to the Internet via a satellite link.

In a further aspect, the invention relates to a satellite gateway for communicating data in a hybrid satellite-terrestrial system. The satellite gateway comprises a transmitter means and a receiver means. The transmitter means is arranged to transmit downlink communication data from the Internet via a satellite link from one of a LEO satellite and a MEO satellite to the user terminal. The receiver means is arranged to receive uplink communication data to the Internet via a terrestrial link from the user terminal to the satellite gateway. Further, the transmitter means and receiver means are arranged to enable concurrent transmitting and receiving.

In one embodiment, the satellite gateway may be arranged to send and receive uplink communication data and downlink communication data to and from the Internet.

In one embodiment, the transmitter means is further arranged to transmit downlink communication data from the Internet through a terrestrial link from the satellite gateway to the user terminal.

In one embodiment, the transmitter means is further arranged to transmit downlink communication data from the Internet through the terrestrial link from the satellite gateway to the user terminal up to a data rate threshold and transmit downlink communication data from the Internet via a satellite link from the one of a LEO satellite and a MEO satellite to the user terminal above the data rate threshold.

In one embodiment, the transmitter means is further arranged to transmit satellite configuration information to the user terminal through the terrestrial link.

In one embodiment, the transmitter means on the satellite gateway further comprises a steerable antenna. The steerable antenna may be at least one of a mechanically steerable antenna and a electronically steerable antenna.

In one embodiment, the transmitter means on the satellite gateway further comprises a steerable phased array antenna. This embodiment allows an antenna that is steerable without additional moving parts, the phased array antenna may further be arranged to transmit uplink communication data to a plurality of different satellites. By this the satellite gateway may utilise a single transmitting means while still maintaining a high level of flexibility. By reducing the number of moving parts the robustness of the user terminal may be increased.

In one embodiment, the transmitter means on the satellite gateway further comprises a steerable phased array antenna. This embodiment allows an antenna that is steerable without additional moving parts, the phased array antenna may further be arranged to transmit uplink communication data to a satellite. By this the satellite gateway may communicate with satellites in different directions without time consuming realignment of the antenna, thus improving the level of flexibility.

In one embodiment, the transmitter means on the satellite gateway further comprises a steerable phased array antenna. This embodiment allows an antenna that is steerable without additional moving parts, the phased array antenna may further be arranged to transmit uplink communication data to a plurality of different satellites. By this the satellite gateway may communicate concurrently with satellites in different directions without realignment of the antenna, thus improving the level of flexibility.

In one embodiment, the transmitter means on the satellite gateway further comprises a steerable phased array antenna. This embodiment allows an antenna that is steerable without additional moving parts, the phased array antenna may further be arranged to transmit uplink communication data to a plurality of different satellites. By this the satellite gateway may communicate concurrently with satellites in different directions without realignment of the antenna, thus improving the level of flexibility. For example, uplink communication data may be transmitted to one or a plurality of GEO satellites, one or a plurality of MEO satellites, one or a plurality of LEO satellites, or a combination thereof.

In one embodiment, the satellite gateway may be arranged to send uplink communication data to a plurality of satellites. For example, uplink communication data may be transmitted to one or a plurality of GEO satellites, one or a plurality of MEO satellites, one or a plurality of LEO satellites, or a combination thereof. The uplink data may be sent through different satellites depending on specific needs, such as delay, capacity and such. For example communication data with low demands on delay may be routed to satellites in a higher orbit while communication data with high demands on delay may be routed to satellites in a lower orbit.

In one embodiment, the satellite gateway may be arranged to send uplink communication data to a plurality of satellites to perform a handover from a first satellite to a second satellite. For example, uplink communication data may be transmitted to one or a plurality of GEO satellites, one or a plurality of MEO satellites, one or a plurality of LEO satellites, or a combination thereof. By transmitting uplink communication data to a plurality of satellites during the handover, a more stable handover may be performed.

In one embodiment, the transmitter means is further arranged to transmit information related to the direction of the one of a LEO satellite and a MEO satellite to the user terminal via a terrestrial link.

In one embodiment, the satellite gateway may be arranged to receive satellite configuration information and that the satellite gateway may be configured according to the received satellite configuration information. As an example configuration information may be received over a terrestrial connection or over a satellite connection. Other possibilities include storage in a local database, coupled to hardware such as a portable memory or any combination thereof. This embodiment allows for change management and configuration or reconfiguration of the satellite gateway and which satellite or satellites that amay be used for communication. Thus allowing a more stable communication channel while utilizing one or more satellites having a non-stationary direction. For example, such satellites may be a LEO satellite or a MEO satellite.

In one embodiment, the satellite gateway may be arranged to receive satellite configuration information and that the satellite gateway may be configured according to the received satellite configuration information. As an example configuration information may be received over a terrestrial connection. Other possibilities include storage in a local database, coupled to hardware such as a portable memory or any combination thereof. This embodiment allows for change management and configuration or reconfiguration of the satellite gateway and which satellite or satellites that amay be used for communication. Thus allowing a more stable communication channel when a satellite is out of order, malfunctioning, is re-routed or similar.

In one embodiment, a satellite gateway may be arranged to receive satellite configuration information. The satellite configuration information may comprise information relating to a satellite orbit. The information relating to a satellite orbit may be combined with information relating to a position of the satellite gateway. By knowing the position of the satellite and the position of the satellite gateway the relative direction can be calculated. Such calculation can be performed by the satellite gateway or at a centralized location. This embodiment allows for aligning a satellite transmitting means towards a direction of the one of a LEO satellite and a MEO satellite. The direction of the one of a LEO satellite and a MEO satellite may be variable over time and depend on the selection of a specific satellite out of a plurality of possible satellites. The information relating to a position of the satellite gateway may come from a plurality of different sources, such as a positioning device at the satellite gateway, a triangulation made by the terrestrial network, manual input or a combination thereof.

In one embodiment, a satellite gateway may be arranged to receive satellite configuration information in response to a situation where a change of satellite is necessary. As an example configuration information may be received over a terrestrial connection or over a satellite connection. A situation where a change of satellite is necessary may for an example occur if the active satellite moves out of range, are lacking in bandwidth, is re-routed, breaks, malfunctions, a weather situation or any other deficiency in the satellite link. The change of satellite may also be a planned redirection, such as changing from one satellite to a second one. By utilizing satellites that move relative to the earth surface, if a satellite moves out of range during a communication session, there may be a need to change the satellite which the satellite gateway is arranged to communicate with. By receiving satellite configuration information in response to a situation where a change of satellite is necessary this embodiment allows for a decreased degree of downtime that could otherwise occur from a malfunctioning or similar satellite.

In one embodiment, a satellite gateway may be arranged to transmit satellite configuration information to a second satellite gateway in response to a situation where a change of satellite gateway is necessary. As an example configuration information may be transmitted over a terrestrial connection or over a satellite connection. A situation where a change of satellite gateway is necessary may for an example occur if the active satellite moves out of range, is re-routed, a satellite gateway breaks, malfunctions, a weather situation or any other deficiency in the satellite gateway. The change of satellite gateway may also be a planned redirection, such as changing from one satellite gateway to a second one. By utilizing satellites that move relative to the earth surface, if a satellite gateway moves out of range during a communication session, there may be a need to change the satellite gateway which the satellite is arranged to communicate with. By receiving satellite configuration information in response to a situation where a change of satellite gateway is necessary this embodiment allows for a decreased degree of downtime that could otherwise occur from a malfunctioning or similar satellite gateway.

In one embodiment, a satellite gateway may be arranged to receive information relating to a weather situation. The information relating to the weather situation may be combined with information relating to a position of a user terminal to predict a temporary loss of communication through a satellite link. By knowing the predicted or present weather situation and the position of the user terminal the predicted or present weather situation at the position of the user terminal can be calculated. Such calculation can be performed by the satellite gateway, by the user terminal or at a centralized location. The information relating to a position of a user terminal may come from a plurality of different sources, such as a positioning device at the terminal, a triangulation made by the terrestrial network, manual input or a combination thereof. A predicted weather situation may be used to predict a temporary loss of communication through a satellite link. For example rain may result in a dampened communication signal due to rain fade.

In one embodiment, a satellite gateway may be arranged to receive information relating to a weather situation. The information relating to the weather situation may be combined with information relating to a position of a user terminal to predict a temporary loss of communication through a satellite link. By knowing the predicted or present weather situation and the position of the user terminal the predicted or present weather situation at the position of the user terminal can be calculated. Such calculation can be performed by the satellite gateway, by the user terminal or at a centralized location. The information relating to a position of a user terminal may come from a plurality of different sources, such as a positioning device at the terminal, a triangulation made by the terrestrial network, manual input or a combination thereof. A predicted weather situation may be used to predict a temporary loss of communication through a satellite link. For example rain may result in a dampened communication signal due to rain fade. This embodiment allows for redirecting a communication link before a temporary loss of communication may occur. The satellite may be a LEO satellite, a MEO satellite, a GEO satellite or a combination thereof. The direction of the one of a LEO satellite and a MEO satellite may be variable over time and depend on the selection of a specific satellite out of a plurality of possible satellites. The communication link may be a satellite link, a terrestrial link or a combination thereof.

In one embodiment, a satellite gateway may be arranged to receive information relating to a weather situation. The information relating to the weather situation may be combined with information relating to a position of a user terminal to predict a temporary loss of communication through a satellite link. By knowing the predicted or present weather situation and the position of the user terminal the predicted or present weather situation at the position of the user terminal can be calculated. Such calculation can be performed by the satellite gateway, by the user terminal or at a centralized location. The information relating to a position of a user terminal may come from a plurality of different sources, such as a positioning device at the terminal, a triangulation made by the terrestrial network, manual input or a combination thereof. A predicted weather situation may be used to predict a temporary loss of communication through a satellite link. For example rain may result in a dampened communication signal due to rain fade. This embodiment allows for directing a satellite communication link before a temporary loss of communication may occur. The satellite may be a LEO satellite, a MEO satellite, a GEO satellite or a combination thereof. The direction of the one of a LEO satellite and a MEO satellite may be variable over time and depend on the selection of a specific satellite out of a plurality of possible satellites.

In one embodiment, a satellite gateway may be arranged to receive information relating to a weather situation. The information relating to the weather situation may be combined with information relating to a position of the satellite gateway to predict a temporary loss of communication through a satellite link. By knowing the predicted or present weather situation and the position of the satellite gateway the predicted or present weather situation at the position of the satellite gateway can be calculated. Such calculation can be performed by the satellite gateway or at a centralized location. The information relating to the position of the satellite gateway may come from a plurality of different sources, such as a positioning device at the satellite gateway, a triangulation made by a terrestrial network, manual input or a combination thereof. A predicted weather situation may be used to predict a temporary loss of communication through a satellite link. For example rain may result in a dampened communication signal due to rain fade.

In one embodiment, a satellite gateway may be arranged to receive information relating to a weather situation. The information relating to the weather situation may be combined with information relating to a position of the satellite gateway to predict a temporary loss of communication through a satellite link. By knowing the predicted or present weather situation and the position of the satellite gateway the predicted or present weather situation at the position of the satellite gateway can be calculated. Such calculation can be performed by the satellite gateway or at a centralized location. The information relating to the position of the satellite gateway may come from a plurality of different sources, such as a positioning device at the satellite gateway, a triangulation made by a terrestrial network, manual input or a combination thereof. A predicted weather situation may be used to predict a temporary loss of communication through a satellite link. For example rain may result in a dampened communication signal due to rain fade. This embodiment allows for redirecting a communication link before a temporary loss of communication may occur. The satellite may be a LEO satellite, a MEO satellite, a GEO satellite or a combination thereof. The direction of the one of a LEO satellite and a MEO satellite may be variable over time and depend on the selection of a specific satellite out of a plurality of possible satellites. The communication link may be a satellite link, a terrestrial link or a combination thereof.

In one embodiment, a satellite gateway may be arranged to receive information relating to a weather situation. The information relating to the weather situation may be combined with information relating to a position of the satellite gateway to predict a temporary loss of communication through a satellite link. By knowing the predicted or present weather situation and the position of the satellite gateway the predicted or present weather situation at the position of the satellite gateway can be calculated. Such calculation can be performed by the satellite gateway or at a centralized location. The information relating to the position of the satellite gateway may come from a plurality of different sources, such as a positioning device at the satellite gateway, a triangulation made by a terrestrial network, manual input or a combination thereof. A predicted weather situation may be used to predict a temporary loss of communication through a satellite link. For example rain may result in a dampened communication signal due to rain fade. This embodiment allows for directing a satellite communication link before a temporary loss of communication may occur. The satellite may be a LEO satellite, a MEO satellite, a GEO satellite or a combination thereof. The direction of the one of a LEO satellite and a MEO satellite may be variable over time and depend on the selection of a specific satellite out of a plurality of possible satellites.

In one embodiment, a satellite gateway may be arranged to transmit satellite configuration information to a second satellite gateway in response to a predicted or present weather situation at the position of the satellite gateway. As an example configuration information may be transmitted over a terrestrial connection or over a satellite connection. A situation where a change of satellite gateway is necessary may for an example be the weather situation at the position of the satellite gateway. The change of satellite gateway may also be a planned redirection, such as changing from one satellite gateway to a second one. By utilizing satellites that move relative to the earth surface, if a satellite gateway moves out of range during a communication session, there may be a need to change the satellite gateway which the satellite is arranged to communicate with. By receiving satellite configuration information in response to a situation where a change of satellite gateway is necessary this embodiment allows for a decreased degree of downtime that could otherwise occur from a weather situation at the position of the satellite gateway. This embodiment may also be used to increase the performance of the satellite link due to choosing a satellite gateway based on a weather situation.

In one embodiment, the transmitter means on the satellite gateway further comprises a steerable phased array antenna. This embodiment allows an antenna that is steerable without additional moving parts, the phased array antenna may further be arranged to transmit uplink communication data to a satellite. By this the satellite gateway may communicate with satellites in different directions without time consuming realignment of the antenna, thus improving the level of flexibility.

In one embodiment, the transmitter means on the satellite gateway further comprises a steerable phased array antenna. This embodiment allows an antenna that is steerable without additional moving parts, the phased array antenna may further be arranged to transmit uplink communication data to a plurality of different satellites. By this the satellite gateway may communicate concurrently with satellites in different directions without realignment of the antenna, thus improving the level of flexibility.

In a further aspect, the invention relates to a system with a plurality of satellite gateways for communicating data in a hybrid satellite-terrestrial system. The satellite gateways each comprises a transmitter means and a receiver means. The transmitter means is arranged to transmit downlink communication data from the Internet via a satellite link from one of a LEO satellite and a MEO satellite to the user terminal. The receiver means is arranged to receive uplink communication data to the Internet via a terrestrial link from the user terminal to the satellite gateways. Further, the transmitter means and receiver means are arranged to enable concurrent transmitting and receiving.

In one embodiment, a system with a plurality of satellite gateways may be arranged to perform a handover of a satellite connection from a first satellite gateway to a second satellite gateway. A situation where a change of satellite gateway is necessary may for an example occur if the active satellite moves out of range, is re-routed, a satellite gateway breaks, malfunctions, a weather situation or any other deficiency in the satellite gateway. The change of satellite gateway may also be a planned redirection, such as changing from one satellite gateway to a second one. By utilizing satellites that move relative to the earth surface, if a satellite gateway moves out of range during a communication session, there may be a need to change the satellite gateway which the satellite is arranged to communicate with. By receiving satellite configuration information in response to a situation where a change of satellite gateway is necessary this embodiment allows for a decreased degree of downtime that could otherwise occur from a malfunctioning or similar satellite gateway.

In one embodiment, a first satellite gateway in a system with a plurality of satellite gateways may be arranged to transmit satellite configuration information to a second satellite gateway in a system with a plurality of satellite gateways in response to a situation where a change of satellite gateway is necessary. As an example configuration information may be transmitted over a terrestrial connection or over a satellite connection. A situation where a change of satellite gateway is necessary may for an example occur if the active satellite moves out of range, is re-routed, a satellite gateway breaks, malfunctions, a weather situation or any other deficiency in the satellite gateway. The change of satellite gateway may also be a planned redirection, such as changing from one satellite gateway to a second one. By utilizing satellites that move relative to the earth surface, if a satellite gateway moves out of range during a communication session, there may be a need to change the satellite gateway which the satellite is arranged to communicate with. By receiving satellite configuration information in response to a situation where a change of satellite gateway is necessary this embodiment allows for a decreased degree of downtime that could otherwise occur from a malfunctioning or similar satellite gateway.

In one embodiment, a first satellite gateway in a system with a plurality of satellite gateways may be arranged to transmit satellite configuration information to a second satellite gateway in a system with a plurality of satellite gateways in response to a situation where a change of satellite gateway is necessary. The change of satellite gateway may also be a planned redirection in order to improve the behavior of the system with a plurality of satellite gateways. For an example, improvements may be made relating to stability, throughput, redundancy, downtime and similar.

In one embodiment, the transmitter means on the plurality of satellite gateways further comprises a steerable antenna. The steerable antenna may be at least one of a mechanically steerable antenna and a electronically steerable antenna.

In one embodiment, the transmitter means on the plurality of satellite gateways further comprises a steerable phased array antenna. This embodiment allows an antenna that is steerable without additional moving parts, the phased array antenna may further be arranged to transmit uplink communication data to a satellite. By this the satellite gateway may communicate with satellites in different directions without time consuming realignment of the antenna, thus improving the level of flexibility.

In one embodiment, the transmitter means on the plurality of satellite gateways further comprises a steerable phased array antenna. This embodiment allows an antenna that is steerable without additional moving parts, the phased array antenna may further be arranged to transmit uplink communication data to a plurality of different satellites. By this the satellite gateway may communicate concurrently with satellites in different directions without realignment of the antenna, thus improving the level of flexibility.

BRIEF DESCRIPTION OF THE APPENDED DRAWINGS

The invention is described in the following illustrative and non-limiting detailed description of exemplary embodiments, with reference to the appended drawings, wherein.

All figures are schematic, not necessarily to scale, and generally only show parts which are necessary in order to

DETAILED DESCRIPTION OF PREFERRED EMBODIMENTS OF THE INVENTION elucidate the invention, wherein other parts may be omitted or merely suggested. Throughout the figures the same reference signs designate the same, or essentially the same features.

The present invention can be used to provide communication at least partly using a satellite link which results in more efficient low latency communication where the bandwidth requirements on a terrestrial link can be kept low.

Figure 1:
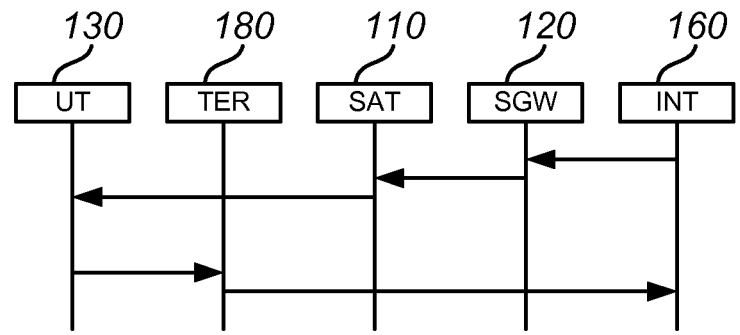
FIG. 1 is a schematic illustration of a method according to a first aspect of the present invention.
Figure 2:
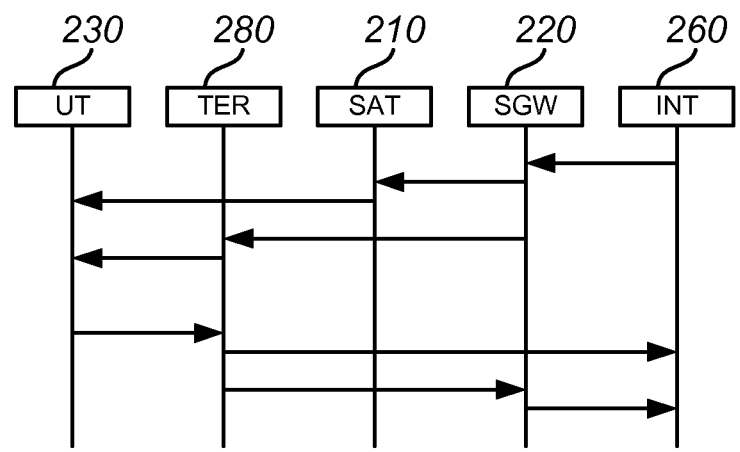
FIG. 2 is a schematic illustration of a method according to one embodiment of the invention.

The invention is described in the following illustrative and non-limiting detailed description of exemplary embodiments, with reference to the appended drawings, wherein:

The steps illustrated in FIG. 1 and FIG. 2 may be performed in any order and are not limited to a specified order. The steps may further be performed concurrently or after each other. Hence the illustrations should not be interpreted as having a specified time frame.

FIG. 1 shows a schematic illustration 100 of a method for communicating data in a hybrid satellite-terrestrial system, according to an aspect of the present invention. The method comprises the steps of receiving and transmitting. The receiving is to a user terminal 130 where downlink communication data from the Internet 160 is received. The downlink communication data is received via a satellite gateway 120 and a satellite link 110. The satellite link 110 is from one of a low earth orbit, LEO, satellite and a medium earth orbit, MEO, satellite 110 to the user terminal 130. The transmitting is from the user terminal 130 where uplink communication data is transmitted to the Internet 160. The uplink communication data is transmitted via at least one terrestrial link 180.

FIG. 2 shows a schematic illustration 200 of a method for communicating data in a hybrid satellite-terrestrial system, according to one embodiment of the present invention. The method comprises the steps of receiving and transmitting. The receiving is to a user terminal 230 where downlink communication data from the Internet 260 is received in different ways. Some downlink communication data is received via a satellite gateway 220 and a satellite link 210. The satellite link 210 is from one of a LEO satellite and a MEO satellite 210 to the user terminal 230. Some downlink communication data is received via the satellite gateway 220 and from a terrestrial link 280. The terrestrial link 280 may be one or a plurality of different types of links, such as for example xDSL, 2G, 3G, WiMax, WLL, PSTN, optical fibre or a combination thereof. The transmitting is performed from an user terminal 230 where uplink communication data is transmitted to the Internet 260 in different ways, such as for example over xDSL, 2G, 3G, WiMax, WLL, PSTN, optical fibre or a combination thereof. Some uplink communication data is transmitted via at least one terrestrial link 280. Some uplink communication data is transmitted via at least one terrestrial link 280 and the satellite gateway 220.

Figure 3:
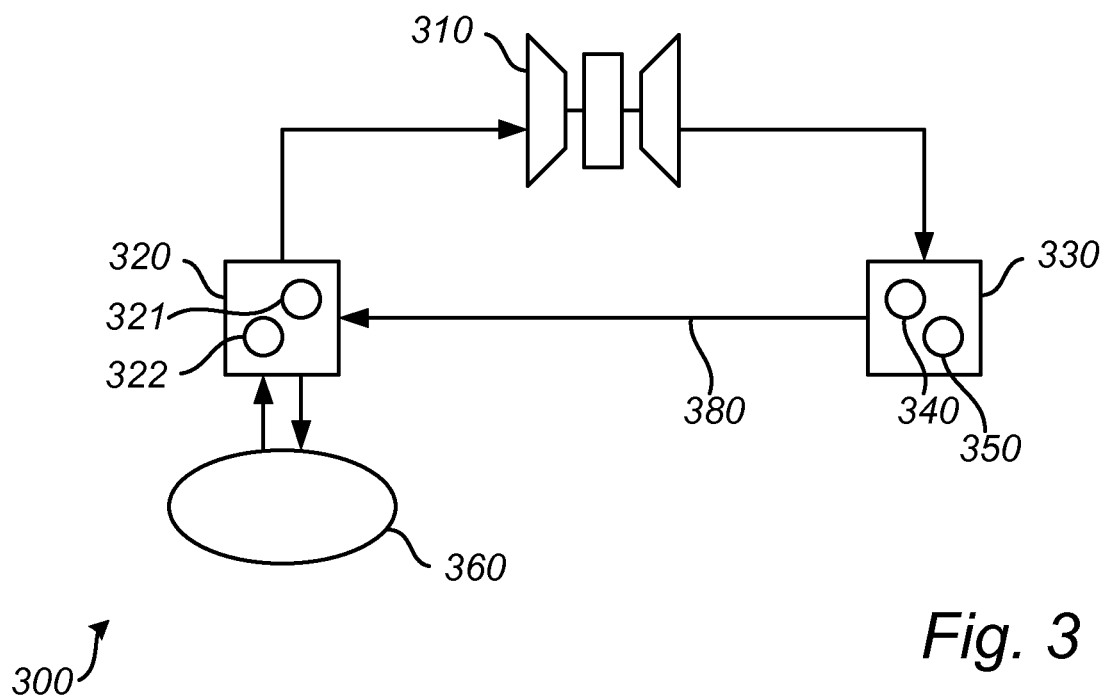
FIG. 3 is a schematic illustration of an arrangement according to a second aspect of the present invention.

FIG. 3 shows a schematic illustration of an arrangement 300 for communicating data in a hybrid satellite-terrestrial system according to a second aspect of the present invention. The arrangement comprises a user terminal 330, a satellite 310 and a satellite gateway 320. The satellite gateway 320 comprises transmitter means 321 and receiver means 322. The transmitter means 321 are arranged to transmit downlink communication data from the Internet 360 to the satellite 310. The receiver means 322 are arranged to receive uplink communication data to the Internet 360 from the user terminal 330. The transmitter means 321 may for an example be an IP encapsulator with encapsulation using Multiprotocol Encapsulation (MPE), Unidirectional Lightweight Encapsulation (ULE), Generic Stream Encapsulation (GSE), or other types of encapsulation. Further, a modulator supporting DVB-S, DVB-S2, DVB-S2X or other types of modulation can be used. Further upconverters, amplifiers transmission antennas and other necessary satellite transmission equipment may also be used where necessary. The receiver means 322 may for an example be a xDSL modem, a cellular modem, a WLL transceiver, a PSTN modem, an optical fibre transceiver, or a combination thereof. The satellite 310 is arranged to receive downlink communication data from the satellite gateway 320 and transmit downlink communication data to the user terminal 330. The satellite 310 may be a LEO satellite or a MEO satellite. The user terminal 330 comprises receiver means 340 and transmitter means 350. The receiver means 340 is arranged to receive downlink communication data which is sent from the satellite 310. The transmitter means 350 is arranged to transmit uplink communication data to the Internet 360 via a terrestrial link 380. The receiver means 340 may for an example be a reflector antenna with feedhorn and LNB or electronic receiver, a phased array antenna with beamforming, or other types of reflector antenna/receiver combination or other electronically steerable antennas. The receiver means may also comprise a tuner and a demodulator (front-end) for receiving satellite communication of the standard DVB-S, DVB-S2, DVBS-2X or other types of satellite transmissions. The transmitter means 350 may for an example be a xDSL modem, a cellular modem, a WLL transceiver, a PSTN modem, an optical fibre transceiver, or a combination thereof.

Figure 4:
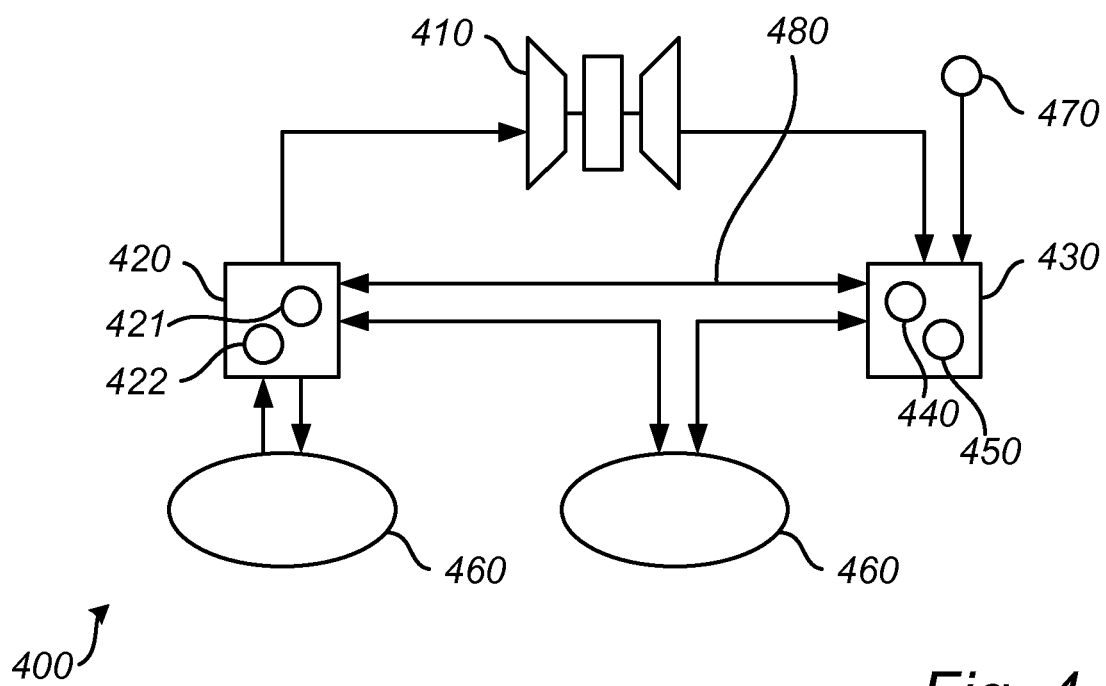
FIG. 4 is a schematic illustration of an arrangement according to one embodiment of the invention.

FIG. 4 shows a schematic illustration of an arrangement 400 for communicating data in a hybrid satellite-terrestrial system according to one embodiment of the invention. The arrangement comprises a user terminal 430, a satellite 410 and a satellite gateway 420. The satellite gateway 420 comprises transmitter means 421 and receiver means 422. The transmitter means 421 are arranged to transmit downlink communication data from the Internet 460 to the satellite 410. The receiver means 422 are arranged to receive uplink communication data to the Internet 460 from the user terminal 430. The transmitter means 421 may for an example be an IP encapsulator with encapsulation using Multiprotocol Encapsulation (MPE), Unidirectional Lightweight Encapsulation (ULE), Generic Stream Encapsulation (GSE), or other types of encapsulation. Further, a modulator supporting DVB-S, DVB-S2, DVB-S2X or other types of modulation can be used. Further upconverters, amplifiers transmission antennas and other necessary satellite transmission equipment may also be used where necessary. The transmitter means 422 may for an example be a xDSL modem, a cellular modem, a WLL transceiver, a PSTN modem, an optical fibre transceiver, or a combination thereof. The receiver means 422 may for an example be a xDSL modem, a cellular modem, a WLL transceiver, a PSTN modem, an optical fibre transceiver, or a combination thereof. The transmitter means of the satellite gateway 420 is further arranged to send downlink communication data to the user terminal 430 via a terrestrial link 480. The terrestrial link 480 may to some extent be over the Internet 460. The satellite 410 is arranged to receive downlink communication data from the satellite gateway 420 and transmit downlink communication data to the user terminal 430. The satellite 410 may be a LEO satellite or a MEO satellite. The user terminal 430 comprises receiver means 440 and transmitter means 450. The receiver means 440 is arranged to receive downlink communication data which is sent from the satellite 410. The receiver means 440 is further arranged to receive downlink communication data through a terrestrial link 480, which to some extent may be over the Internet 460. The transmitter means 450 is arranged to transmit uplink communication data to the Internet 460 via a terrestrial link 480, which to some extent may be over the Internet 460. The user terminal 430 is further arranged to receive configuration information 470 relating to satellite configuration information, such as a direction in which a satellite 410 is located. The receiver means 440 of the user terminal comprise a phased array antenna which is steerable according to instructions received in the configuration information 470. The receiver means 440 may for an example be a reflector antenna with feedhorn and LNB or electronic receiver, a phased array antenna with beamforming, or other types of reflector antenna/receiver combination or other electronically steerable antennas. The receiver means may also comprise a tuner and a demodulator (front-end) for receiving satellite communication of the standard DVB-S, DVB-S2, DVBS-2X or other types of satellite transmissions. The transmitter means 450 may for an example be a xDSL modem, a cellular modem, a WLL transceiver, a PSTN modem, an optical fibre transceiver, or a combination thereof.

Aspects of a general system for providing communication by a satellite and a terrestrial system are well known in the art and will not be described in greater detail.

While specific embodiments have been described, the skilled person will understand that various modifications and alterations are conceivable within the scope as defined in the appended claims.

The invention claimed is:

1. A method of connecting a user terminal to the Internet, comprising:
    providing a satellite gateway connected to the Internet, wherein the satellite gateway is configured to establish an uplink satellite link to a satellite;
    determining a location of the satellite gateway;
    establishing a terrestrial link for the user terminal to the satellite gateway and establishing a downlink satellite link from the satellite to the user terminal;
    receiving, at the user terminal, downlink communication data from the Internet via the satellite;
    sending, at the user terminal, uplink communication data to the Internet via the terrestrial link, wherein the user terminal is configured to receive the downlink communication data and to transmit the uplink communication data concurrently;
    determining a location of the user terminal;
    receiving information, at the satellite gateway, relating to a weather situation;
    predicting whether a temporary loss of communication through one or more of the satellite links will occur using the information relating to the weather situation and one or more of the location of the satellite gateway and the location of the user terminal;
    if a temporary loss of communication through one or more of the satellite links is predicted, before a temporary loss of communication occurs, redirecting both of the satellite links to another satellite; and
    predicting whether a temporary loss of communication through the uplink satellite link will occur using the information relating to the weather situation and the location of the satellite gateway; and
    if a temporary loss of communication through the uplink satellite link is predicted, before a temporary loss of communication occurs, performing handover of the uplink satellite link from the satellite gateway to a second satellite gateway.

2. The method of claim 1, wherein all information to and from the Internet pass through the satellite gateway.

3. The method of claim 1, further comprising maintaining the terrestrial link for the user terminal while redirecting both of the satellite links to another satellite.

4. The method of claim 1, further comprising establishing a terrestrial link to the user terminal from the satellite gateway, provided that downlink communication data to the user terminal via the satellite link is received over a data rate threshold, and downlink communication data to the user terminal via the terrestrial link to the user terminal is received up to the data rate threshold.

5. The method of claim 1, further comprising establishing a terrestrial link to the user terminal from the satellite gateway, provided that downlink communication data to the user terminal via the terrestrial link to the user terminal is in response to a temporary loss of communication through the satellite link.

6. The method of claim 1, further comprising receiving, at the satellite gateway, satellite configuration information.

7. The method of claim 1, further comprising receiving, at the user terminal, satellite configuration information.

8. The method of claim 1, further comprising performing handover of the terrestrial link for the user terminal to the second satellite gateway.

9. The method of claim 1, wherein the user terminal is configured to transmit uplink communication data to the Internet only via a terrestrial link from the user terminal to the satellite gateway.

10. A user terminal for connecting to the Internet, comprising:
    a receiver configured to receive downlink communication data from the Internet via a downlink satellite link from a satellite; and
    a transmitter configured to send uplink communication data to the Internet via a terrestrial link to a satellite gateway;
    wherein the user terminal is configured to receive the downlink communication data and to transmit the uplink communication data concurrently; and
    wherein, upon receipt of a command from the satellite gateway and before a temporary loss of communication with the satellite occurs, the user terminal terminates the downlink satellite link from the satellite and establishes another downlink satellite link from another satellite; and
    wherein the user terminal is configured to perform handover of the terrestrial link for the user terminal to a second satellite gateway.

11. The user terminal of claim 10, wherein the user terminal remains in coverage of the terrestrial link during the termination of the downlink satellite link from the satellite and establishment of the another downlink satellite link from another satellite.

12. The user terminal of claim 10, wherein the user terminal is configured to receive satellite configuration information.

13. The user terminal of claim 10, wherein the user terminal is configured to transmit uplink communication data to the Internet only via a terrestrial link from the user terminal to the satellite gateway.

14. A satellite gateway for connecting a user terminal to the Internet, comprising:
    a receiver;

a transmitter; and
a steerable antenna;
wherein the satellite gateway is configured to:
establish a connection to the Internet;
establish an uplink satellite link to a satellite;
establish a terrestrial link with the user terminal and receive uplink communication data via the terrestrial link;
receive information from the Internet related to the uplink communication data and send the information to the satellite;
determine a location of the satellite gateway;
determine a location of the user terminal;
receive information relating to a weather situation;
predict a temporary loss of communication between the satellite and at least one of the satellite gateway or user terminal using the information relating to the weather situation and one or more of the location of the satellite gateway and the location of the user terminal; and
before a temporary loss of communication occurs, perform at least one of establish an uplink satellite link to another satellite and/or send satellite configuration information to the user terminal redirecting the user terminal to another satellite; and
before a temporary loss of communication occurs, perform handover from the satellite gateway to a second satellite gateway.

15. The satellite gateway of claim 14, wherein the satellite gateway redirects the user terminal to another satellite while the user terminal still has an operational terrestrial link and an operational satellite link.

16. The satellite gateway of claim 14, wherein the satellite gateway is further configured to receive satellite configuration information.

17. The satellite gateway of claim 14, wherein the satellite gateway is further configured to send and receive uplink communication data and downlink communication data to and from the Internet, and wherein all information to the Internet from the user terminal and from the Internet to the satellite pass through the satellite gateway.

18. The satellite gateway of claim 14, wherein the satellite gateway is further configured to redirect both of the satellite links, from satellite gateway to satellite and from satellite to user terminal, to another satellite.

* * * * *